United States Patent [19]

Weinberg

[11] 4,393,444

[45] Jul. 12, 1983

[54] MEMORY ADDRESSING CIRCUIT FOR CONVERTING SEQUENTIAL INPUT DATA TO INTERLEAVED OUTPUT DATA SEQUENCE USING MULTIPLE MEMORIES

[75] Inventor: Leonard Weinberg, Haddonfield, N.J.

[73] Assignee: RCA Corporation, New York, N.Y.

[21] Appl. No.: 204,694

[22] Filed: Nov. 6, 1980

[51] Int. Cl.$^3$ .......................... G06F 7/00; G01S 7/44
[52] U.S. Cl. .................................. 364/200; 343/5 DP
[58] Field of Search ... 364/200 MS File, 900 MS File; 343/5 DP

[56] References Cited

U.S. PATENT DOCUMENTS

| | | | |
|---|---|---|---|
| 3,277,449 | 10/1966 | Shooman | 364/200 |
| 3,617,719 | 11/1971 | Wong et al. | |
| 3,631,406 | 12/1971 | Kurner | |
| 3,633,173 | 1/1972 | Edge | |
| 3,691,531 | 9/1972 | Saltini et al. | 364/200 |
| 3,716,859 | 2/1973 | Webb et al. | |
| 3,781,812 | 12/1973 | Wymore et al. | 364/200 |
| 3,827,027 | 7/1974 | Towson et al. | 364/900 |
| 3,922,643 | 11/1975 | Poole | |
| 3,936,806 | 2/1976 | Batcher | 364/200 |
| 4,027,291 | 5/1977 | Tokura et al. | 364/200 |
| 4,065,810 | 12/1977 | Cramer et al. | |
| 4,069,970 | 1/1978 | Buzzard et al. | |
| 4,080,599 | 3/1978 | Conti | 364/200 |
| 4,093,995 | 6/1978 | Smith et al. | 364/200 |
| 4,189,767 | 2/1980 | Ahuja | 364/200 |

Primary Examiner—Mark E. Nusbaum
Assistant Examiner—William G. Niessen
Attorney, Agent, or Firm—Joseph S. Tripoli; Robert L. Troike; Donald W. Phillion

[57] ABSTRACT

A system for converting sequentially received data words, in the form of successively received groups of data words, into an interleaved output data word sequence, with each group of received data words consisting of T successive series of R data words. The system comprises N memories, each having W words locations, where $W \cdot N \geq T \cdot R$ and where the N memories form a single memory matrix which is employed to process every group of received data words. Writing logic is provided for writing successively received data words of a first group of data words into the N memories in a predetermined sequence. Reading logic is provided for reading from the memories every $R^{th}$ data word of the first group of data words written into the to leave an available word location in each instance where a data word was read therefrom. The writing logic also includes logic for writing successively received data words of each subsequently received group of data words into successively occurring available word locations created by the reading therefrom of the data words of the immediately preceding group of data words.

8 Claims, 10 Drawing Figures

FUNCTIONAL DIAGRAM OF ENTIRE SYSTEM m = mth PROCESSING INTERVAL
n = nth WORD IN EACH PROCESSING INTERVAL

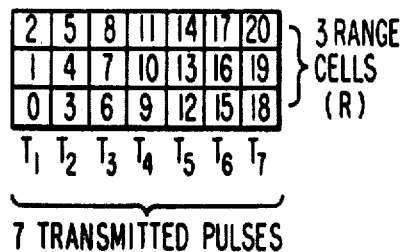

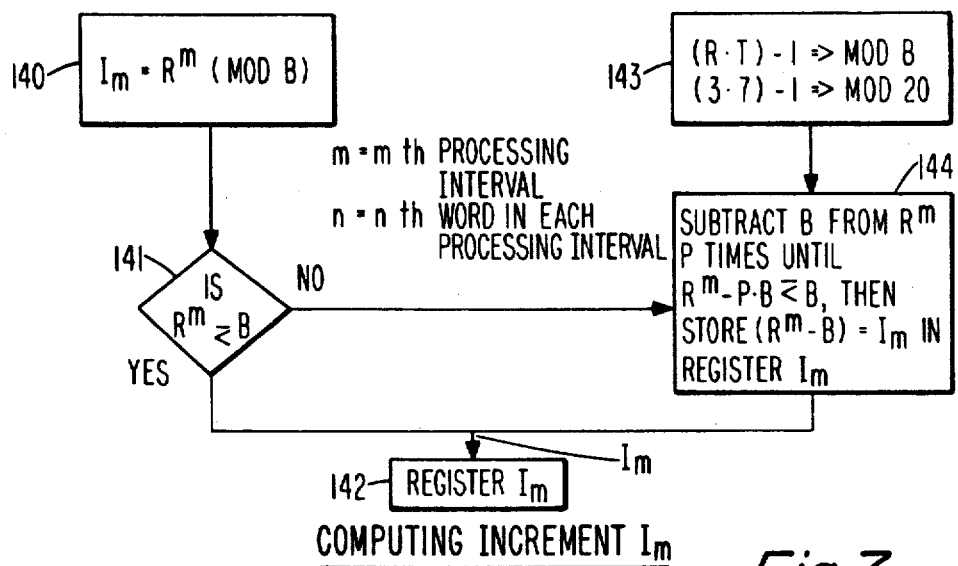
COMPUTING INCREMENT $I_m$
*Fig. 7*
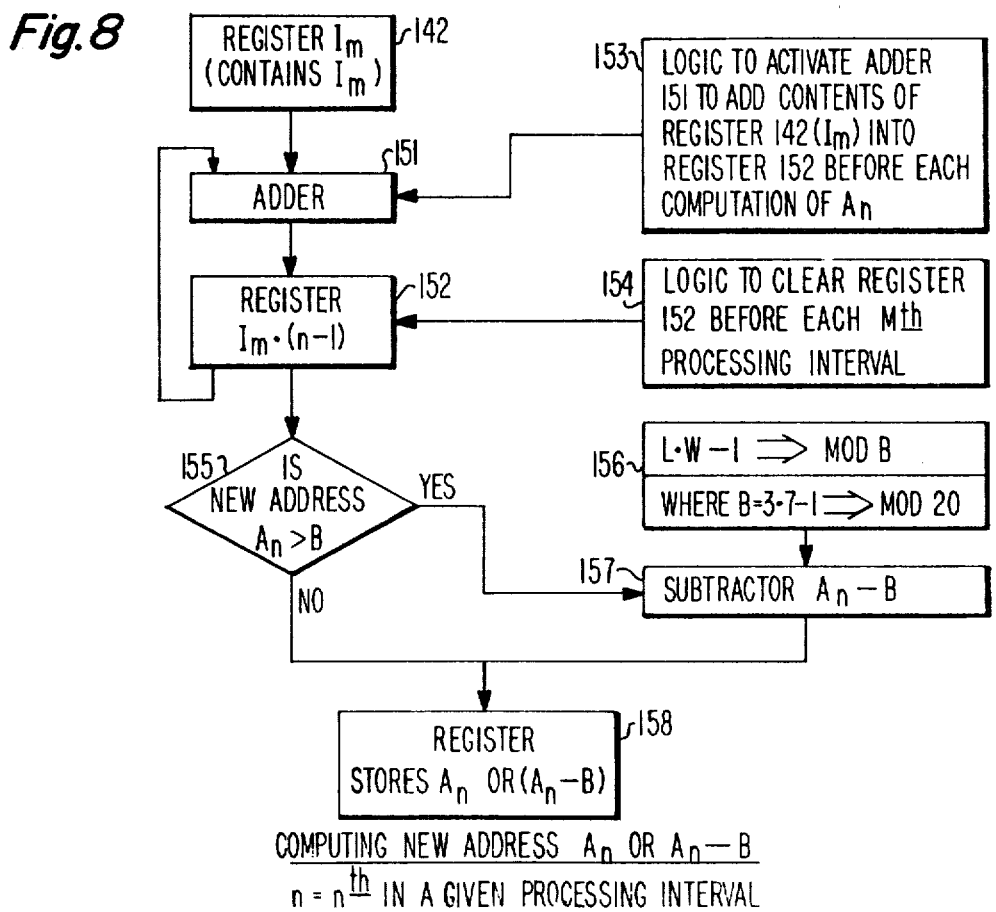
COMPUTING NEW ADDRESS $A_n$ OR $A_n - B$
n = $n^{th}$ IN A GIVEN PROCESSING INTERVAL

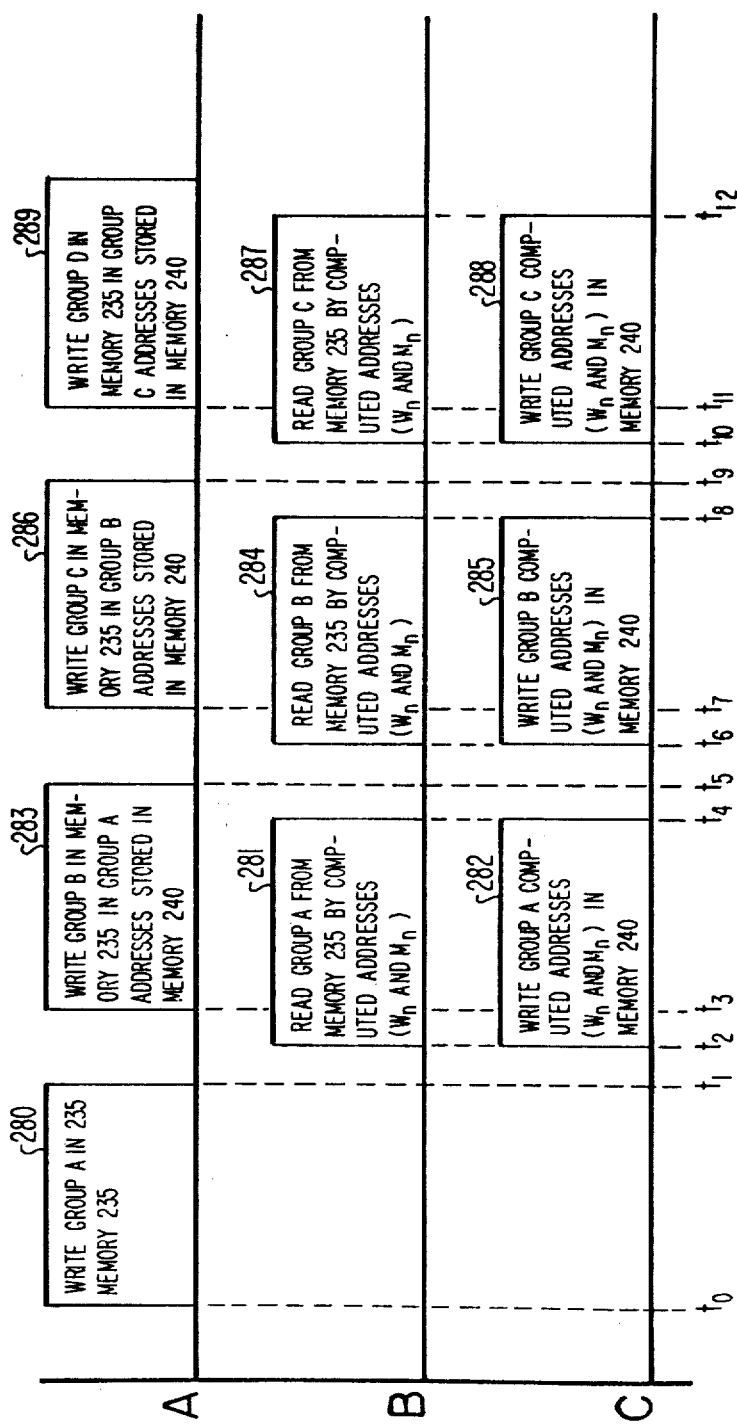

MEMORY ADDRESSING CIRCUIT FOR CONVERTING SEQUENTIAL INPUT DATA TO INTERLEAVED OUTPUT DATA SEQUENCE USING MULTIPLE MEMORIES

This invention relates generally to corner turning memory addressing circuits wherein sequentially received data words are converted to an interleaved output data word sequence, and more specifically to such circuits employing common multiple memories in which data words are written in a sequential manner and read therefrom in an interleaved manner.

In some data processing operations it is desirable to receive digitized data words in a sequential order, and then to process such data words in an interleaved manner. Radar signal processors are good examples of the foregoing. More specifically, a radar transmitter might send out groups of T transmitted pulses, each pulse resulting in R range pulses being reflected back to the transmitter site; a range pulse being defined as the pulse reflected back from a given range cell which, in turn, is defined as that range of distances between first and second distances from the transmitter, as for example, the range of distances between 50 and 55 kilometers. All of the R range pulses from each transmitted pulse are received before the range pulses resulting from the transmission of the next occurring transmitted radar pulse are received. Thus, the reflected range pulses are received in a sequential order with the range pulses from the first transmitted pulse being received first, followed by the range pulses from the second transmitted pulse and so on, for all T transmitted pulses of a group.

However, it is desired to process the received range pulses in an order different from their order of reception. Specifically, all of the range pulses from the first range cell are processed together, followed by the range pulses from the second range cell, and so on. Thus, if the received range pulses are stored sequentially in a memory in the same order in which they are received they must be read from the memory in an interleaved manner such that all of the range pulses from the first cell resulting from any given group of T transmitted pulses can be processed together. In the foregoing manner, the range pulses from each successive range cell resulting from said given group of T transmitted pulses are processed. Subsequent groups of range pulses resulting from subsequent groups of T transmitted pulses are processed in a similar manner.

In prior art systems, two memories operating in alternate fashion have been employed to implement the foregoing fuction. More specifically, a first group of received range pulses are stored in the first memory, and the next group of received range pulses are stored in the second memory while the first group of range pulses are being read from the first memory in an interleaved manner and then processed. Next, while the group of range pulses stored in the second memory are being processed, a third group of range pulses are received and stored in the first memory. Since a sophisticated radar system might employ as many as 7,000 or more range pulses from each of 16 or more transmitted pulses in each group of transmitted pulses the amount of required memory can be seen to be very large. In order to reduce the amount of required memory, a technique known as "corner turning" has been developed which replaces the two memories with a single memory and employs a memory addressing circuit for converting the sequentially received ranged pulses, in the form of digitized data words, into the desired interleaved output data word sequence. Specifically, such a system sequentially stores the received range pulses from a given group of transmitted pulses in the single memory in the order in which they are received. The data words are then read from the single memory in an interleaved fashion such that the range pulses resulting from all of the transmitted pulses in the group of transmitted pulses for the first (closest) range cell are extracted first, followed by the range pulses resulting from the group of transmitted pulses for the second range cell, and so on. The second group of range pulses, resulting from second group of transmitted pulses, are then stored sequentially in those memory locations of the memory which have just been emptied (i.e. made available) by the reading out therefrom of the first group of range pulses. Next, such second group of range pulses are read from the memory in an interleaved fashion such that the range pulses from the first range cell are first read from memory followed by the range pulses from the second range cell, and so on. Thus, it can be seen that at the same time a given group of range pulses is being read from the memory, the next received group of range pulses can be written into those memory locations just emptied by the reading therefrom of the range pulses from the said prior given group of range pulses. Accordingly, a single memory now serves the same function which before required two memories, each of the same size as the single memory.

However, the use of a single memory still limits the speed of operation of the system in that the rate of accessing of the range data words from the memory is limited by the time it takes to effect a single accessing thereof.

A principal purpose of the present invention is to increase the speed of operation of a corner turning memory system by employing multiple memories which act as a single memory matrix and which sequentially receive the range pulses (in the form of data words) from every group of T transmitted pulses and output such data words in the aforementioned interleaved manner, thus permitting more than one memory to be accessed at a given time for the writing into or the reading therefrom as compared to the prior art limitation wherein only one memory access at any given time is possible.

In accordance with a preferred form of the invention there are provided a plurality of N independent memories, each having at least W levels of memory locations and employed in predetermined sequences to successively store sequentially received data words in increasing levels of memory locations of said memories, where N, R, and T are selected to have values such that the accessing of memory locations for the writing or reading of words into or from the memories will occur not more than once every S data words for any particular memory $M_n$ of said N memories, where S is an integer greater than unity. Also provided are means for computing the word location level in which each $R^{th}$ occurring stored data word is stored, means for computing a particular memory $M_n$ in which said each $R^{th}$ occurring stored data word is stored, and means for reading each successive $R^{th}$ occurring stored data word from the memory in which it is stored in accordance with the computed word location level $W_n$ and the computed memory $M_n$. In the drawing:

FIG. 1 is a chart showing a group of seven (T) transmitted pulses with three (R) range pulses reflected back for each transmitted pulse;

FIG. 2 shows five progressive stages of storing the received range pulses of FIG. 1 serially into a memory matrix of four memories and reading such range pulses therefrom in an interleaved manner;

FIG. 3 is another chart showing certain parameters employed in reading out in an interleaved manner the R range pulses resulting from each successively received group of range pulses;

FIG. 4 is another chart showing some of the calculated memory location levels and the particular memories containing each of the data words to be read from the memory matrix for two consecutive groups of received range pulses (data words);

FIG. 7 is a function diagram for computing the distance increment $I_m$ between data words to be read from memory for each processing interval;

FIG. 8 is function diagram for computing the parameter $A_n$ which is employed in computing the word location level $W_n$ and the memory $M_n$ in which a particular interleaved data word to be read from memory is stored;

FIG. 10 is a set of bar waveforms showing the gross timing relations in the operation of the system.

Figure 5:
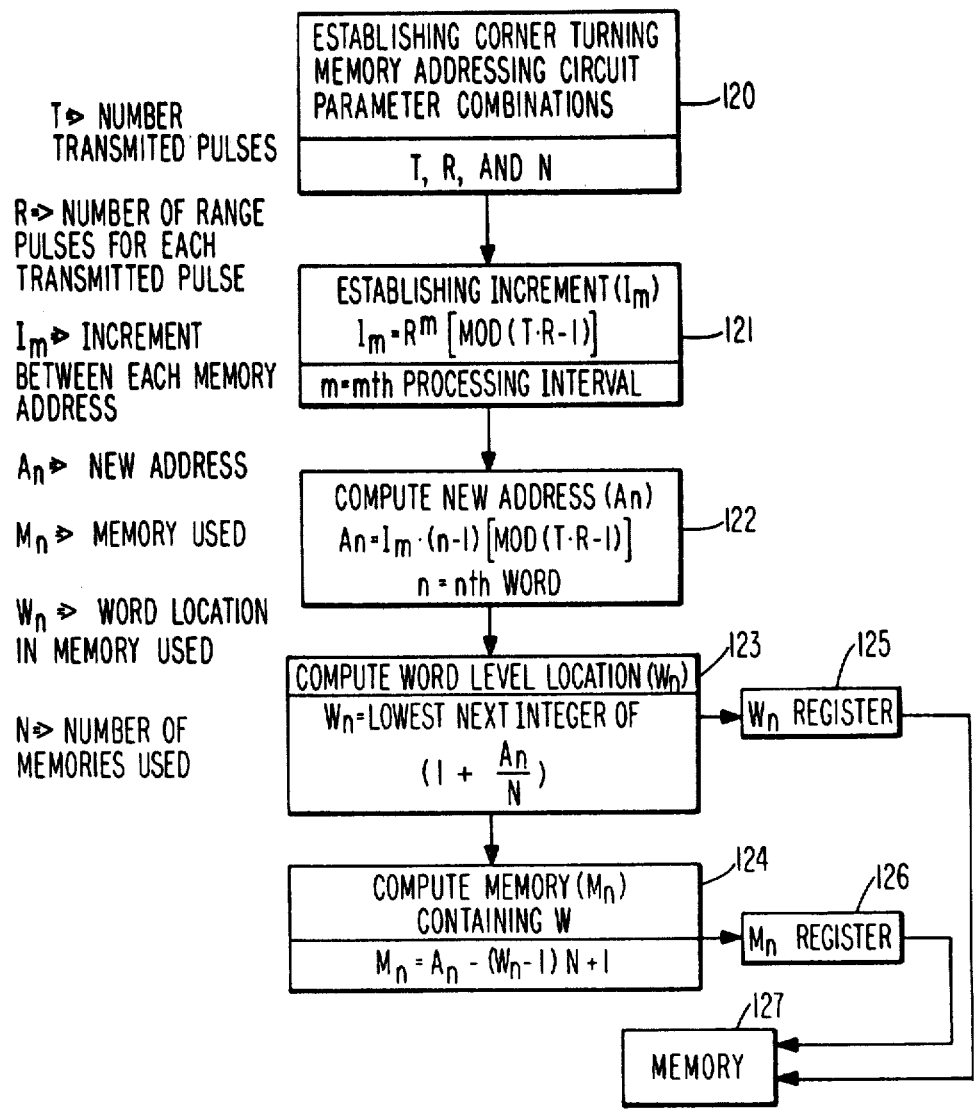
FIG. 5 is a functional diagram of a method for computing the memory location levels and the particular memory in which each interleaved data word to be read from the memory matrix is stored.

Before discussing the diagrams of FIGS. 6, 7, 8, and 9 which show the structural and functional means for storing sequentially received data words (derived from the received range pulses) and then reading such data words from the memory matrix in an interleaved order, a general discussion of the basic principles of the invention will be set forth by means of a discussion of the diagrams of FIGS. 1–5.

As discussed generally above, a basic concept of the present invention is the use of a plurality of N independent memories arranged to form a single memory matrix which processes all received groups of range pulses in a system for receiving the range pulses (changed into data words) sequentially, storing the received data words in said N memories in predetermined sequences, and then reading such data words in an interleaved fashion from said memories in such a manner that none of the individual ones of the N memories will be accessed more than once every S write-ins or read-outs of said memory matrix, where S is an integer greater than unity and preferably is equal to the number of memories employed. Such an arrangement permits the writing-in or reading-out of data words from more than one of the individual memories simultaneously, thereby increasing the overall speed of the system as compared with systems employing only one memory.

There are only a finite number of combinations of numbers of transmitted pulses T, numbers of range pulses R for each transmitted pulse, and numbers of N independent memories which will result in the operational requirements set forth above; namely, the accessing of any given memory only every minimum S occurrences of memory write-ins or read-outs.

One such combination of numbers of transmitted pulses T, of reflected range signals R, and N independent memories is shown in FIGS. 1 and 2, wherein the number of transmitted pulses is 7, with each transmitted pulses producing 3 range pulses, one from each of 3 range cells, and employing 4 independent memories. The transmitted pulses are transmitted in groups of 7 pulses labeled $T_1$–$T_7$ as shown in FIG. 1 with each transmitted pulse producing 3 reflected range pulses from 3 range cells, and further, with each of the 3 reflected range pulses being received back at the transmitter site before the next 3 received range pulses resulting from the next subsequent transmitted pulse are received back at the transmitter site. Thus, the 3 range pulses identified by the numerals 0, 1, and 2 in FIG. 1 resulting from transmitted pulse $T_1$ are received back at the transmitter site before the next 3 reflected range pulses, identified by numerals 3, 4, and 5 and resulting from the second transmitted pulse $T_2$, are received back at the transmitter site.

Thus, it can be seen that the 21 range pulses shown in FIG. 1 and identified by the numerals 0 through 20 are received at the transmitter site in the ascending order of the numerals representing them.

At the beginning of operation of the system the range pulses 0–20 from the first group of 7 transmitted pulses are received at the transmitter site and, after being digitized into data words, are stored in the four memories 100, 101, 102, and 103 of FIG. 2A in the order listed, which is defined herein as the given sequence of said memories, and are represented by the same numeral. Thus, the numeral 0 in memory 100 of FIG. 2A is a digitized form of the pulse represented by the numeral 0 in FIG. 1. The digitized form of the received pulse defines the precise time the corresponding pulse was received at the transmitter site and also the amplitude of the received pulse with respect to a given reference amplitude.

As the range pulses are received and transformed into data words, they are stored successively into successive ones of the memories 100, 101, 102, and 103 in successive word locations thereof. Thus, data word 0, data word 1, data word 2, and data word 3 are stored consecutively and respectively in memories 100, 101, 102, and 103 in the first word location level a thereof. The next 4 data words identified by numerals 4, 5, 6, and 7 are stored in the second word location b of memories 100–103 respectively. Similarly, the next 4 data words 8 through 11 are stored in the third word location level c, the next 4 data words 12 through 15 in the fourth word location level d, the next 4 data words 16 through 19 in the fith word location level e, and the last data word 20 in the sixth word location f of memory 100.

It will be noted that 'word location levels' are defined here as being consecutive and ascending addressable memory locations in a memory. Thus, word location level 'a' in memory 100 of FIG. 2A is also memory location 0, word location level b is also memory location 1, and so on. The use of letters to define word locations levels eliminates confusion vis a vis the numeric nomenclature employed for the data words.

As discussed above, it is desired that the range pulses received from a given range be processed together. Thus, in FIG. 1 the data words corresponding to the 7 interleaved received range pulses received from the first range cell and represented by numerals 0, 3, 6, 9, 12, 15, and 18 are to be processed together. Similarly, the 7 interleaved range pulses 1, 4, 7, 10, 13, 16, and 19 received from the second range cell are to be processed together, as are the 7 interleaved range pulses 2, 5, 8, 11, 14, 17, and 20 received from the third range cell.

Thus, referring again to FIG. 2A it can be seen that the following word location and memory levels contain the first group of 7 range pulses to be considered.

1. Data word 0 in word location level a of memory 100.
2. Data word 3 in word location level a of memory 103.
3. Data word 6 in word location level b of memory 102.
4. Data word 9 in word location level c of memory 101.
5. Data word 12 in word location level d of memory 100.
6. Data word 15 in word location level d of memory 103.
7. Data word 18 in word location level e of memory 102. By logic to be described later in FIGS. 5 through 8, it will be shown how the data words 0, 3, 6, 9, 12, 15, and 18 are read from memories 100 through 103 in the desired interleaved order and more specifically how the addresses, including the word location level and the particular memory in which each data word is stored, is calculated.

For the present, assume that the data words 0, 3, 6, 9, 12, 15, and 18 are in fact read from the memories 100 and 103 in that sequence, thus leaving each of the 7 corresponding memory locations of the 4 memories 100 to 103 empty and available to receive another data word. Such 7 memory locations now emptied by the reading out therefrom of data words 0, 3, 6, 9, 12, 15, and 18 will, in fact, be filled by the first 7 received data words formed by the next 7 received range pulses resulting from the next (the second) group of 7 transmitted pulses.

While the 7 data words from the first 7 range pulses received from the second group of 7 transmitted pulses are being stored in the manner described above, the second group of 7 range pulses 1, 4, 7, 10, 13, 16, and 19, as shown in FIGS. 1 and 2, from the first group of 7 transmitted pulses can be read from the 4 memories 100 and 103 of FIG. 2A, thereby emptying 7 more word locations in memories 100–103. The next 7 data words derived from the next 7 received range pulses 7, 8, 9, 10, 11, 12, and 13 resulting from the second group of transmitted pulses can then be written into the second group of 7 word location just made available in the memories 100–103.

Concurrently therewith the third group of data words 2, 5, 8, 11, 14, 17, and 20 derived from the last group of 7 range pulses 2, 5, 8, 11, 14, 17, and 20, which resulted from the first group of 7 transmitted pulses, are read from memories 100–103 of FIG. 2A, thereby providing 7 new additional empty word locations in said memories into which the last groups of 7 data words derived from the 7 received range pulses 14, 15, 16, 17, 18, 19 and 20, resulting from the second group of 7 transmitted pulses, can be stored.

Thus, the 21 memory locations of the 4 memories 100–103 now contain the data words derived from the 21 range pulses received from the second group of 7 transmitted pulses, but in memory locations entirely different from those that contained the corresponding 21 data words derived from the 21 range pulses resulting from the first group of 7 transmitted pulses.

The word locations containing the second group of 21 data words resulting from the second group of transmitted pulses are as shown in FIG. 2B, wherein each of the numerals 0 through 20 represents the data word derived from the corresponding range pulse received from the second group of 7 transmitted pulses.

It will be noted in FIG. 2A that because there are 3 range pulses resulting from each transmitted pulse every third employed word location in memories 100–103 is accessed to read the stored data words in the proper interleaved fashion. Such spacing between the accessed (read-out) data words resulting from the first group of transmitted pulses is identified as storage distance increment $I_m$, where m is the $m^{th}$ processing interval. A processing interval is defined, in the example, as the storage of a group of 21 data words in memories 100–103 in the order in which the corresponding range pulses are sequentially received and then reading out from memories 100–103 such data words in an interleaved manner, i.e. reading out from the memories 100–103 every $R^{th}$ stored data words, where R is the number of range cells. In the example being discussed the number of range cells is 3.

For the first processing interval (m=1) the storage distance increment $I_m$ between adjacent $R^{th}$ stored words is equal to 3 and is measured in a predetermined pattern extending from a given $R^{th}$ data word and through the N memories in said given sequence of memories 100–103 in successive ascending levels of memory locations of said memories. Thus data word 3 is located 3 memory locations from data word 0, measured from the lowest location level 1 of memory 100 in sequence through the lowest memory location level of memories 100, 101, 102, and 103 to the next $R^{th}$ data word 3. Similarly, the next $R^{th}$ data word 6 is positioned 3 memory locations from data word 3, measured from the first memory location level of memory 103 and then through the second word location levels of memories 100, 101, and 102. The foregoing is true because the data words derived from the received range pulses resulting from the first group of transmitted pulses were stored in consecutive order in the ascending word location levels of the 4 memories 100–103 in a given sequence of memories 100, 101, 102, and 103.

However, when the first group of data words are read from memories 100–103 and the second group of 21 data words are stored therein in the locations indicated in FIG. 2B, every $R^{th}$ data word is no longer spaced apart in the 4 memories by 3 memory locations, i.e. $I_m$ no longer is equal to 3. More specifically data word 0 remains memory location 1 of memory 100, whereas the next $R^{th}$ data word 3 is now located in the third word location level c of memory 101 which is a distance of 9 memory locations of memories 100–103 measured in said predetermined pattern through the word location levels of the four memories in the given sequence disussed above. Thus $I_m=9$ when m=2. The memory locations between data words 0 and the next $R^{th}$ data word 3 in FIG. 2B contain, respectively, data words 7, 14, 1, 8, 15, 2, 9, and 16.

The absolute address $A_n$ of every $R^{th}$ data word, where n is the $n^{th}$, $R^{th}$ data word in the $m^{th}$ processing interval, is an address parameter which is always measured from the first memory location level of memory 100 and then in said predetermined pattern through said memories 100–103 in said given sequence and through successive levels of memory locations. since the 4 memories 100–103 have a finite capacity of 24 memory locations the memory locations of some data words will exceed the memory capacity. The memory locations of such data words are determined by returning to the first word location level of the first memory 100 and continuing the counting of memory locations from such first word location in said predetermined pattern.

The specific algorithm and structural means by which the value $A_n$ is computed for each data word will be discussed in detail later herein in connection with FIGS. 5 and 8. Computation of $I_m$ for any given processing interval is effected by the algorithm and structure shown in FIGS. 5 and 7. As will be apparent from the expression for computing $A_n$ (block 122 of FIG. 5) it is first necessary to compute $I_m$. Once $I_m$ is determined in accordance with the expression shown in block 121 of FIG. 5, the value of $A_n$ can be determined as will be discussed later herein. Consider first, however, the values of $W_n$ and $A_n$ shown in FIG. 4, assumed to be previously computed.

The upper portion of the chart of FIG. 4 shows in column II the value of $A_n$ for each data word stored in FIG. 2A for the first processing interval, (m=1). In the case of the data storage arrangement of FIG. 2A, R is equal to $I_m$ for reasons discussed above, e.g. that FIG. 2A shows the data words resulting from the first group of transmitted pulses. From the value of $A_n$ and the number of memories employed, which in the example being discussed is 4, the word location level $W_n$ ($W_n$ can have levels a-f) and the particular memory $M_n$ of memories 100–103 in which the data word is stored can be determined by means of the expression shown in blocks 123 and 124, respectively, of FIG. 5.

Thus, in column III of the upper half of the chart of FIG. 4, the word location level $W_n$ of each successively stored $R^{th}$ data word is shown having been computed by the expression shown in block 123 of FIG. 5. Thus, for example the seventh $R^{th}$ data word stored in the memories of FIG. 2A, which is in fact data word 18, is stored in the fifth word location level e. From the expression contained in block 124 of FIG. 5, the particular memory storing data word 18 is computed to be memory 102.

Considering another example, data word 1 in the storage arrangement of FIG. 2A has been computed to be in word location level a as shown in column III and in the second memory 101 as indicated in column IV.

Thus, in reading out the 21 data words derived from the range pulses resulting from the first group of 7 transmitted pulses, each $R^{th}$ word location, by word location level and memory, is calculated and the corresponding $R^{th}$ word read from the calculated location in memory, thus making such calculated location available for storage of a subsequent data word. As will be described in connection with the logic of FIG. 5, such calculated word location level and memory $M_n$ of each of said $R^{th}$ words is stored and employed to subsequently enable the writing into such emptied and available memory location the proper data word derived from the next received group of range pulses.

Returning again to the second group of 21 data words derived from the group of received range pulses stored in the 4 memories in the order shown in FIG. 2B, the order in which they are read therefrom will now be discussed generally. As stated above, the storage distance increment $I_m$ between every $R^{th}$ data word for the second processing interval is 9. Thus, the data words stored as shown in FIG. 2B will be read serially (one at a time) therefrom at absolute storage distance increments of multiples of 9.

The lower half of the chart of FIG. 4 illustrates the parameters involved in reading out some of the data words of the second processing interval from the 4 memories 100–103 of FIG. 2B. As in the upper half of the chart of FIG. 4, the $R^{th}$ data words are shown in column I, and the absolute address $A_n$ is shown in column II and can be seen to be multiples of 9 (modulo 20). A discussion of the meaning of modulo 20 will be set forth in more detail later herein. It is sufficient to state at this time that it means that a number base 20 is employed as opposed to a number base 10, for example, so that the counting between successive memory locations recycles back to 0 after the count of 20 is reached and continues through the memory locations in said predetermined pattern. The calculations of $W_n$ (expressed in letters as per FIG. 2) and $M_n$ for the second processing interval are shown in columns III and IV of the lower half of the chart of FIG. 4.

Thus, the data words stored as shown in FIG. 2B are read therefrom in accordance with the word location level $W_n$ and the memory $M_n$ as calculated in columns III and IV of the lower half of FIG. 4. Following the reading of such data words of the second processing interval from the 4 memories 100–103, the 21 data words derived from the third group of range pulses resulting from the third group of transmitted pulses (the third processing interval) is written into the memory locations in the order in which said memory locations are emptied so that such third group of data words will be stored in the 4 memories 100–103 as shown in FIG. 2C.

The calculation of the storage distance increment $I_m$ for the reading out of the words stored as shown in FIG. 2C results in $I_m$ being equal to 7. More specifically, since the storage arrangement of FIG. 2C represents the storage of the third group of 21 data words, the value of $I_m$ is in essence $R^3 = 3^3$, as shown in FIG. 7, and which will be discussed in more detail later. However, since only 21 memory locations are employed in the modulo 20 numbering system of the particular memory structure used in the embodiment being described, the calculation of $I_m$ as being equal to 7 in fact results from subtracting 20 from 27, which is equal to $R^3 = 3^3$. In other words, in a modulo 20 system the number 27 is equal to 7.

With $I_m$ equal to 27, $A_n$ is computed as discussed above and subsequently $W_n$ and $M_n$ are computed to determine the precise memory location of each $R^{th}$ data words in the storage arrangement of FIG. 2C. For example, it will be observed that the memory storage distance between data word 0 and data word 3 is in fact 7, and can be counted through the memory locations storing data words 9, 18, 7, 16, 5, and 14.

The fourth group of data words (during the fourth processing interval) are then stored into the memory locations emptied and made available by the reading out of the third group of data words and in the order in which said third group of data words were read from memory, resulting in the storage of said fourth group of 21 data words in the arrangement shown in FIG. 2D.

The calculation of $I_m$ for the reading out of the data words stored as shown in FIG. 2D results in $I_m$ being equal to 1. The value 1 is obtained essentially by multiplying the previous value of $I_m$ (7) by R, which is 3, and then subtracting 20 therefrom. Such computation is in accordance with the calculations of FIG. 7, as mentioned above.

The fifth group of data words is then read into those memory locations emptied by the fourth group of data words being read therefrom and in the order emptied, resulting in the storage pattern shown in FIG. 2E. It will be observed that the storage arrangement of the fifth group of data words is identical to that of the first group which simply means that every fifth group of data words will bring the storage pattern back to the pattern employed in the storage of the first group of data words, i.e. the first processing interval where $m=1$. Thus, it is assured that the accessing of any given memory for writing-in or reading-out of data words never occurs more than every other fourth write-in or read-out transaction. More specifically, by examining each of the 5 storage patterns shown in FIGS. 2A–2E it can be seen that each of the memories 100–103 is never accessed for a write-in or a read-out transaction more than once every four transactions.

Referring now to FIG. 5, there is shown a functional block diagram of the computational steps and the parameters needed to compute the specific memory location level $W_n$ and the particular memory $M_n$ of each interleaved data word to be read therefrom. No specific logic or timing is shown in FIG. 5, only the successive states of computation required to compute $W_n$ and $M_n$. The specific logic, including the timing, required to perform the steps of FIG. 5 is shown in FIGS. 6 through 9. All of the computations shown in FIG. 5 are performed within the logic block 241 of FIG. 6 which will be discussed in detail later herein.

In FIG. 5 the determination of the working combination of the number T of transmitted pulses, the number R of pulses for each transmitted pulse, and the number N of memories which will meet the requirements of a minimum time of access of each memory as set forth above can be determined by trial, by employing a properly programmed computer, for example. Specifically, the writing in of successive groups of R range pulses resulting from T transmitted pulses in N memories and then extracting said successive groups of N range pulses from memory in the interleaved manner described above can be determined for various values T, R, and N, and the results examined to see how often any given memory is accessed. The following combinations of values of T, R, and N are known to be workable combinations and meet the requirements of minimum access discussed above.

| T | R | N |
|---|---|---|
| 7 | 3 | 4 |
| 10 | 7 | 3 |
| 31 | 10 | 3 |
| 61 | 10 | 3 |
| 61 | 10 | 7 |
| 97 | 10 | 3 |

Using the values of the parameters T, R, and N, the value of the storage distance increment $I_m$ is established by the expression shown in block 121 of FIG. 5. As mentioned above m is the $m^{th}$ processing interval where T, R, and N equal 7, 3, and 4, respectively. The value of $I_m$, which is the processing interval, is calculated to be equal to 3 in accordance with the following expression taken from block 121 of FIG. 5.

$$I_m = R^m[\text{MOD}((T \cdot R - 1)]$$

where $m=1$ and $R=3$
therefore $$I_m = 3[\text{MOD}((T \cdot R - 1)] = 3[\text{MOD } 20] = 3$$

Next the value of $A_n$, where n is the $n^{th}$, $R^{th}$ data word to be read from the memory in any given processing interval, is computed according to the expression in block 122 of FIG. 5. As an illustrative example, assume that it is desired to compute $A_n$ for the third ($n^{th}$) interleaved $R^{th}$ data word in the second processing interval to be read from memory. Such word is data word 6 in the memory matrix of FIG. 2B. It can be seen that data word 6 is stored in the fifth word location level e in memory 102. $A_n$ can be seen to be in fact equal to 19 by counting from the lowest word location level a of memory 1 containing data word 0 and then through successive memory location levels of each of the four memories 100–103 in said predetermined sequence. The actual computation of $A_n$ is as follows.

$$A_n = I_m \cdot (n - 1) [MOD((T \cdot R) - 1)]$$
where $m = 2, n = 3, R = 3$
therefore $I_m = 9$, and
therefore $A_n = 9 \cdot 2 [MOD((7 \cdot 3) - 1)] =$
$9 \cdot 2 [MOD \, 20] = 18$ After $I_m$ and $A_n$ have have been computed it is then possible to compute the word level location $W_n$ of the address of the data word to be read from memory. Assuming again that it is the third $R^{th}$ data word 6 in the second processing interval, the value of $W_n$ as determined by the expression in block 123 is as follows:

$$W_n = \text{LOWEST NEXT INTEGER OF} \left(1 + \frac{A_n}{N}\right)$$

therefore $W_n = (1 + 18/4) = 5$. The value of $W_n$ is then supplied into register 125 of FIG. 5 and subsequently into memory 127 where it will be employed by the logic of FIG. 6 to be described later.

Having computed the value $W_n$, it is possible to compute $M_n$ employing the expression in block 124 of FIG. 5. The value of $M_n$ for the third data word 6 of the second processing interval ($m=2$) is then calculated as follows:

$$M_n = A_n - (W-1)N + 1$$

therefore $M_n = 18 - (5-1)4 + 1 = 3$. The computed value $M_n$ is then supplied into register 126 and subsequently into memory 127 where it is employed by the logic of FIG. 6 to read the third data word of the second processing interval from the memory matrix.

Before considering the detailed logic of FIG. 6, the logic of FIGS. 7, 8, and 9, employed for the computation of parameters $I_m$, $A_n$, $W_n$, and $M_n$, will be discussed.

Consider first FIG. 7. In block 140 $I_m$ is defined as being equal to $R^m$(modulo B), where $B-(T \cdot R)-1$, as shown in blocks 140 and 143. The value of m is equal to the $m^{th}$ processing interval as defined hereinbefore. With each successive processing interval $R^m$ is compared with the value B in comparator 141, and as long as $R^m$ is less than B the value of $R^m$ is equl to $I_m$ and is stored in register 142. However, if $R^m$ is greater than B, then B is subtracted from $R^m$ in block 144 as many times as is necessary until $R^m$ becomes equal to or less than B. The result of such calculation, which is equal to $R^m - B$, is stored in register 142.

To compute $A_n$, the logic of FIG. 8 can be employed. Specifically, the contents of register 142 of FIG. 7 also shown in FIG. 8, are supplied to register 152 through adder 151. Register 152 is cleared before each $m^{th}$ processing interval by logic within block 154, which in effect can be the output from controller 190 of FIG. 6, as will be discussed later.

The adder 151 then adds the contents of register 142, which is $I_m$, into register 152 before each computation of $A_n$. This means that register 152 will contain a value equal to $I_m \cdot (n-1)$ for the value of $A_n$ for each $n^{th}$ word in any given processing interval being computed.

The logic within block 153 is included as part of computing logic 241 and responds to the output of TRANSMISSION gate 236 to generate timing pulses to initiate and control the computation of $A_n$ (FIG. 8) in preparation for the computing of $W_n$ and $M_n$ for each received data word.

After each updating of the contents of register 152, such updated content is compared with the value B in block 155, where B is defined within block 156. If $A_n \leq B$ then $A_n$ is stored directly in register 158. If $A_n > B$, then B is substracted from $A_n$, by the logic within block 157, and the resulting value $A_n - B$ is stored in register 158.

Figure 9:
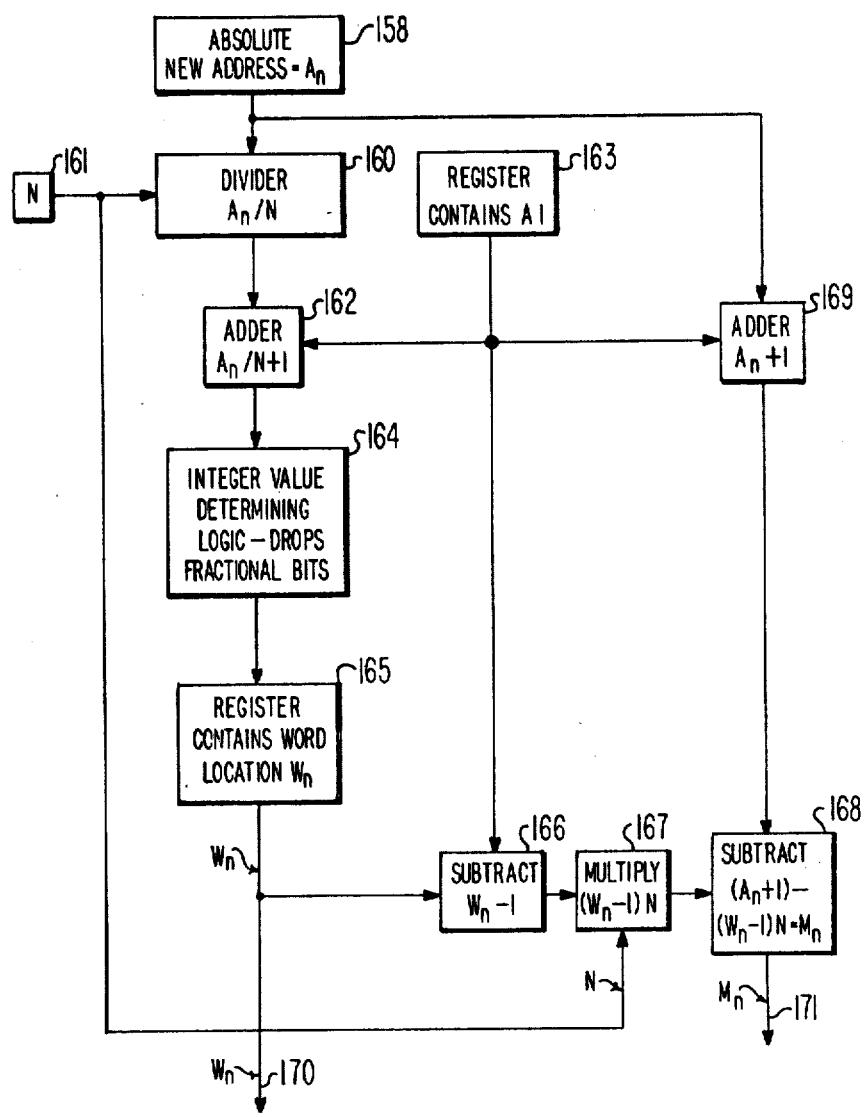
FIG. 9 is yet another function diagram for computing the memory location level $W_n$ and the particular memory $M_n$ in which a given data word to be read from the memory matrix is stored.

With the value of $A_n$ computed, the value of $W_n$, which is dependent of $A_n$ as shown in block 123 on FIG. 5, can now be computed by the logic shown in FIG. 9. In FIG. 9 the value of the absolute address $A_n$, stored in register 158, is supplied to divider 160, which divides $A_n$ by N, the number of memories in the system as indicated by the expression within block 123 of FIG. 5. The value N (FIG. 9) is supplied to divider 160 from register 161. Next, a value 1 is supplied from register 163 to adder 162, to which is also supplied the value $A_n/N$ to produce a quantity $A_n/N + 1$. Such last-mentioned quantity is then supplied to an integr-value-determining logic means 164 which functions to round off the value $A_n/N + 1$ to the next lowest integer. Such rounding-off process is accomplished simply by dropping the fractional bits in the binary output signal supplied from adder 162.

The integer computed in block 164 is then supplied to register 165, and is in fact the integer value of $W_n$ which, as defined above, is the memory location level of the data word which is to be read from the memory matrix.

Once $W_n$ is computed, it is possible to compute $M_n$ in accordance with the expression set forth in block 124 in FIG. 5. The quantity $W_n - 1$ is computed in subtract logic 166 of FIG. 9 to which is supplied the value $W_n$ and also a 1 from register 163. The output of subtract logic 166 is then supplied to multiplication logic 167, which functions to multiply the quantity $W_n - 1$ by N, the number of independent memories in the system. The value N is supplied from register 161.

Next, the quantity $A_n + 1$ is computed in adder logic 169, which receives the quantity $A_n$ from block 158 and a 1 from register 163. The summed output $A_n + 1$ from adder 169 is supplied to subtract logic 168 as is the quantity $(W_n - 1) \cdot N$ from block 167. The quantity $(W_n - 1) \cdot N$ is subtracted from the quantity $A_n + 1$ to produce the quantity $M_n$, which is the particular memory in which the data word being read from the memory matrix is stored.

Figure 6:
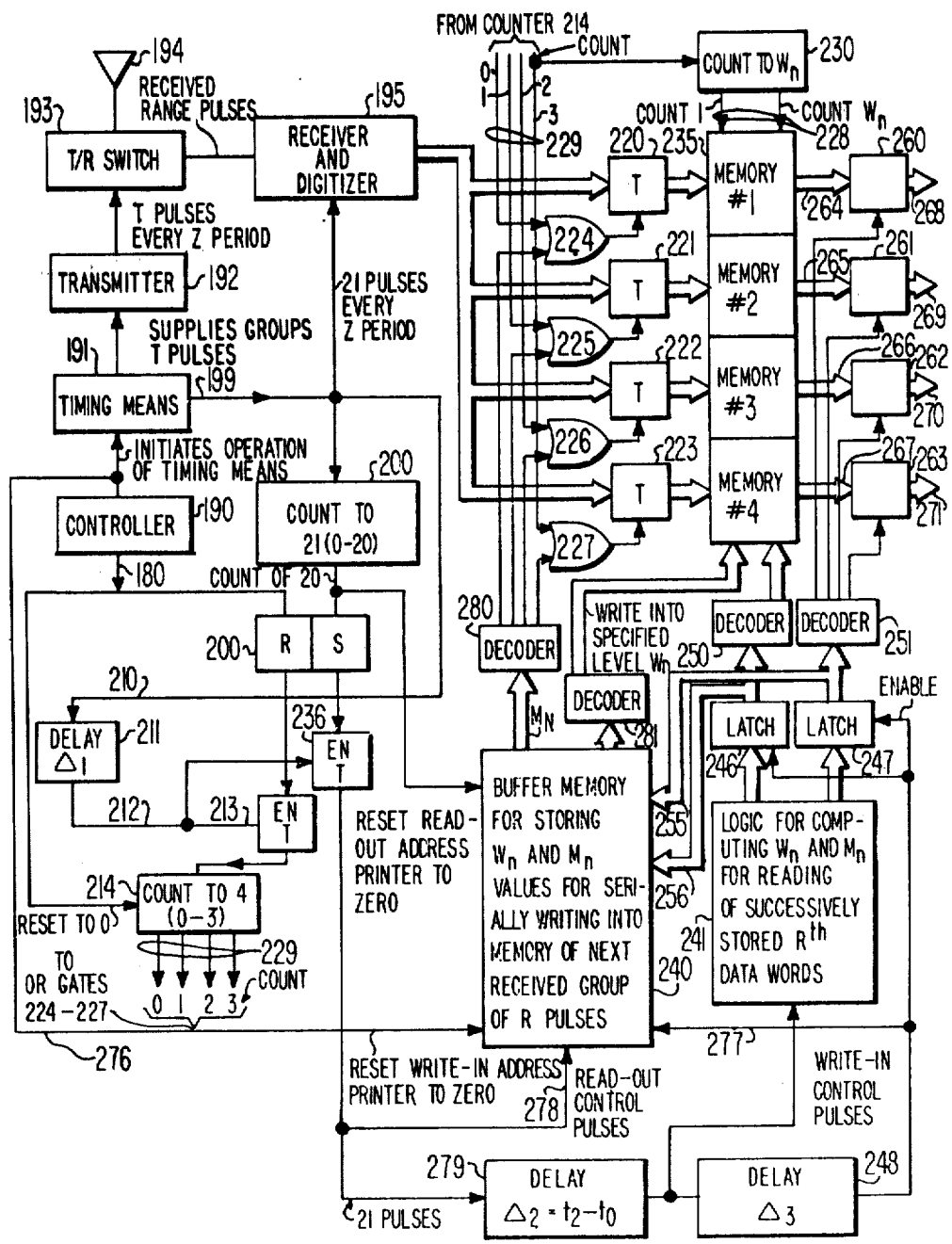
FIG. 6 is a combination block and logic diagram of a structural implementation embodying the invention, and for carrying out the steps of the invention.

Referring now to FIG. 6, there is shown a combined logic and block diagram for the entire system including the transmission of the T transmitted pulses, the reception of the R reflected range pulses, the digitizing of the received range pulses, the sequential storage of said digitized range pulses (data words) in the memories in the order in which said data words are received, the reading out of each group of received data words in the interleaved fashion described hereinbefore by computing the memory word location level $W_n$ and the memory $M_n$ for each interleaved data word to be extracted, the storage of such computed memory locations and memories for the entry of the next subsequent group of received data words into the memory matrix, and the timing means for accomplishing all of the foregoing.

Since the reading out of interleaved data words (digitized range pulses) from the memory matrix cannot be accomplished until at least one group of data words has been written therein, it is necessary to first write into the memory matrix the data words received from the first group of transmitted pulses transmitted at the initiation of the operation of the system. A somewhat different logic arrangement is employed for receiving and storing the data words resulting from the transmission of such first group of transmitted pulses. After storing said first group of data words in the memory matrix 235 of FIG. 6 the logic will be changed slightly to then compute the addresses (memory locations and memories) of each data word of said first group of stored data words (and subsequent groups of data words) in their interleaved sequence so that they can be read from memory in said interleaved sequence, and then to store such computed addresses for use in writing the next subsequently received group of data words into memory in the manner described hereinbefore with respect to FIGS. 1-5.

Consider the transmission and reception of the first group of received data words and the storage of the said first group of data words into the memory matrix 235. It should be noted that counter 200, flip-flop 201, TRANSMISSION gate 213, and counter 214 are employed only in the storage of the first received group of 21 range pulses in memory matrix 235. Initially, a controller 190 is provided to initiate operation of the system by supplying a start pulse to a timing means 191, which then supplies a group of T pulses to transmitter 192. The transmitter 192 in turn supplies T modulated pulses through T/R switch 193 to antenna 194. In the example being used herein, there are 7 transmitted pulses in each group of T transmitted pulses i.e., T=7. The 21 reflected range pulses, resulting from the 7 transmitted pulses, are received by antenna 194 and switched through T/R switch 193 into a receiver and digitizer means 195, which functions to output 21 digitized data pulses to each of the four TRANSMISSION gates 220, 221, 222, and 223. Clock pulses for timing the sequential transmission of such digitized range pulses, or data words, from digitizer 195 to TRANSMISSION gates 220-223, are supplied from timing means 191 to receiver and digitizer means 195 through lead 199. Such clock pulses, which are 21 in number, are properly timed by timing means 191 to be supplied to the receiver and digitizer means 195 at the expected time that each of the 21 range pulses is to be received and digitized from the three range cells on the system.

The 21 pulses from timing means 191 for the first received group of 21 range pulses are also supplied via lead 210 through delay means 211, having a delay time $\Delta_1$, and then through lead 212 to one input of TRANSMISSION gate 213, which has previously been primed by the reset condition of flip-flop 201. Flip-flop 201 was reset at the initiation of the circuit by controller 190 via lead 180, which also reset the count-to-4 counter 214 to 0 at the initiation of operation of the system for reasons to be discussed later. The delay means 211 is of sufficient duration to allow the digitized data words from digitizer 195 to be supplied to TRANSMISSION gates 220–223 before the selected one of such TRANSMISSION gates 220–223 is enabled by the output of counter 214 and OR gates 224–227 for reasons described below.

The first series of 21 clock pulses from timing means 191 are also supplied through delay means 211 and TRANSMISSION gate 213 to cause counter 214 to count repeatedly from its 0 count to its count of 3, successively, until 21 counts have occurred. At the 21 count, the counter 200, which is also counting in response to the first group of 21 pulses from timing means 191 will have counted to 20 to set flip-flop 201, thereby disabling TRANSMISSION gate 213. However, the 21 counts which appeared on the output terminals of counter 214 were supplied via the four output leads 229 successively through the four OR gates 224–227 to the four TRANSMISSION gates 220–223 respectively. Specifically, for example, the count 0 from counter 214 enables TRANSMISSION gate 220 through OR gate 224. The count of 1 from counter 214 next enables TRANSMISSION gate 221 through OR gate 225. Similarly, counts 2 and 3 from counter 214 will energize in next succession the TRANSMISSION gates 222 and 223 through OR gates 226 and 227, respectively.

Thus, the memories #1, #2, #3, and #4 (100–103 in FIG. 2) are successively and repeatedly accessed 21 times by the output of counter 214 which, through OR gates 224–227, enables TRANSMISSION gates 220–223, respectively.

The memory location levels $W_n$ for each data word is determined by the count-to-$W_n$ counter 230 whose input is the count of 3 (the 4th count) output lead of counter 214. The word location levels of the memories #1–#4 of matrix 235 are initially set to the lowest level at the beginning of operation of the system, and then subsequently are raised to their successively higher levels at each count of 3 of countr 214, which count is supplied to counter 230. Thus, each time the counter 214 cycles through its 4 count capacity once, the counter 230 will increment its count by 1 and increase the word location level of memories #1–#4 by activation of successive ones of the output leads 228 of counter 230. At the end of the first group of 21 pulses outputted from timing means 191 via lead 199, the first group of 21 data words will be stored in the memories 1–4 in the pattern shown in FIG. 2A.

When flip-flop 201 is set at the end of the first group of 21 pulses from timing means 191 due to counter 200 reaching the count of 20, TRANSMISSION gate 213 will be disabled and TRANSMISSION gate 236 enabled. The enabling of TRANSMISSION gate 236 will permit the next group of 21 pulses from timing means 191 to be supplied through delay means 211, TRANSMISSION gate 236, and delay means 279 to logic means 241 for computing $W_n$ and $M_n$.

Computing logic 241 will respond to each pulse of the second group of 21 pulses to compute the memory location in memory matrix 235 of each $R^{th}$ data word stored therein for each successive one of the processing intervals as defined above. Each computed values of $W_n$ and $M_n$ are supplied to latches 246 and 247, respectively, immediately upon the computation thereof in logic means 241 a time interval $\Delta_2$ after each one of the 21 pulses from timing means 191. Further, after each one of the 21 pulses generated in and supplied from timing means 191 a pulses, delayed by time $\Delta_3$ due to delay means 248, enable latches 246 and 247 to supply the computed values of $W_n$ and $M_n$ stored therein to decoders 250 and 251. Decoders 250 and 251 function to decode said computed values of $W_n$ and $M_n$ to select the proper memory location level $W_n$ and memory $M_n$ of memory matrix 235 for the particular data word being read therefrom. Such data word is then read from memory matrix 235 and supplied to the proper one of TRANSMISSION gates 260–263 via one of buses 264–267, respectively, and then to the corresponding one of output buses 268–271.

Each computed value of $W_n$ and $M_n$ is also supplied from the output of latches 246 and 247 to the buffer memory storage means 240 under control of write-in control pulses supplied thereto via lead 277, which stores such computed values in the order in which they are computed in the computing logic 241.

The memory locations in memory matrix 235 are emptied and made available for subsequent storage due to the reading therefrom of the data words in accordance with the addresses generated by computing logic 241. The second group of received data words can then be written into such emptied and available data word locations in memory matrix 235 in the order in which they became emptied.

The memory locations into which the data words of the second group of data words are to be written is determined by the addresses, i.e. the values of $W_n$ and $M_n$, stored in buffer memory 240. Such addresses stored in buffer memory 240 can be accessed immediately after the first memory location has been emptied in memory matrix 235 and the addresses ($W_n$ and $M_n$) of said memory location stored in buffer memory 240. Thus, the second group of 21 pulses from the timing means 191, after being delayed for a sufficient time by delay means 211, can then be supplied through TRANSMISSION gate 236 and lead 278 to buffer memory 240 to cause the addresses ($W_n$ and $M_n$) stored in buffer memory 240 to be sequentially accessed and supplied through decoders 280 and 281 to the memory matrix 235 through appropriate logic to be described below. Specifically, the word location level $W_n$ is supplied through decoder 281 to the memory 235 to select the word location level in which the next data word is to be stored. The decoder means 280 decodes the memory select address $M_n$ to supply a signal through one of the four OR gates 224–227 to enable a selected one of the four TRANSMISSION gates 220–223 and thereby to access the proper memory of memories #1–#4.

Thus, the data words of any group of data words can be written into the memory 235 at the same time that the preceding group of data words is being read therefrom in the desired interleaved manner described above.

Because the reading out of data words occurs in an interleaved fashion and the writing in of data words occurs in a sequential fashion, it is necessary that any group of data words should be completely or almost completely written into the memory before being read therefrom. This can be seen from an examination of FIG. 1 wherein the data words of the given group are read into the memory in sequential fashion 0, 1, 2, ... 20, and are read therefrom in interleaved fashion 0, 3, 6, 9, etc. 20. Thus, as shown in FIG. 4 as an example, the data word 18 of a given group of data words would be read therefrom while only the seventh sequentially received data word 6 would have been received and written into the memory. The foregoing is an obviously unworkable arrangement. However, a subsequent group of data words can be written into the memory 235 of FIG. 6 while the prior group of data words is being read therefrom since the writing in of said subsequent group of data words is in the same sequence of memory locations from which the prior group of data words is being read from memory 235 and the addresses thereof ($W_n$ and $M_n$) are being stored in buffer memory 240.

The foregoing is illustrated in the bar waveforms of FIG. 10. Specifically, in FIG. 10 bar waveform A illustrates the writing in to memory 235 of FIG. 6 successive groups of data words designated as groups A, B, C, and D at times $t_0$, $t_3$, $t_7$, and $t_{11}$, each separated by a time increment such as $t_1-t_3$ between groups 280 and 283. It is to be understood that each of the groups of data words in FIG. 10A, such as groups 280, 283, 286, and 289, are derived from 21 received range pulses, as indicated in the example being employed herein.

In bar waveform 10B the blocks 281, 284, and 287 represent the reading of groups of data words from computed memory addresses in memory 235 of FIG. 6. More specifically, the block 281 represents the reading from memory 235 of the 21 data words which were stored in memory 235 during time period $t_0-t_1$ and indicated by block 280. It is to be understood that the reading of the 21 data words of group A from memory 235 of FIG. 6 is done in an interleaved fashion as discussed hereinbefore, whereas the writing of such 21 data words of group A into the memory 235 was done in a sequential manner.

As discussed above, it is necessary to compute each of the address values $W_n$ and $M_n$ for each data word in group A in order to reach such data words from memory 235. As such data word addresses $W_n$ and $M_n$ are computed they are stored in the order computed in buffer memory 240 of FIG. 6 as indicated in the block 282 of the bar waveform of FIG. 10C. As soon as a few of such values $W_n$ and $M_n$ are computed and stored in buffer memory 240 the writing of the next received group of data words, designated as group B in block 283, can begin as shown at time $t_3$. It is only necessary that the reading of the addresses of the data words of group A from the memory locations of buffer storage 240 occur before a data word from the group B data words be written therein. It is also to be noted that the reading of the group A data words from memory 235 of FIG. 6 begins at time $t_2$, which time is after the completion time $t_1$ of the writing into memory 235 of the data words of group A.

At time $t_5$ the writing into memory 235 of the 21 data words of group B data words is completed, as indicated in block 283, so that such group B data words can subsequently be read therefrom, as indicated in block 284 of FIG. 10C beginning at time $t_6$. The reading of the group B data words from memory 235 is done in an interleaved fashion as discussed above, whereas they were written into memory 235 in a sequential manner.

As discussed above, it is necessary to compute the address of each data word of the group B data words in order as they are read in an interleaved fashion from memory 235 of FIG. 6. As each of said addresses is computed it is stored in buffer storage means 240 of FIG. 6, as indicated in block 285 of waveform 10C. Subsequently, the data words of the next received group of data words, designated as group C and shown in block 286 of waveform 10A, are written into memory 235 of FIG. 6 in a sequential manner beginning at time $t_7$ and ending at time $t_9$.

Next, in the manner discussed above, such data words of group C are read from memory 235 of FIG. 6 as indicated in block 287 of FIG. 10A and the computed addresses thereof stored in buffer memory 240, as indicated in block 288 of FIG. 10C. Subsequently, at time $t_{11}$, the next group of data words, designated as group D in block 289, is written into the data memory 235 of FIG. 6.

To perform the above described read-outs, the read out address point of buffer memory 240 is reset to 0 at times $t_1$, $t_5$, and $t_9$ in FIG. 10 immediately after a group of data words has been written into the memory matrix 235 of FIG. 6 under control of a given group of 21 timing pulses from timing source 191. The same group of 21 pulses are delayed in delay means 279 (FIG. 6) for a time interval equal to $t_2-t_0$ in FIG. 10, for example. Such delayed group of 21 timing pulses is then supplied to the computing logic means 241 to begin the read-out of the immediately previously stored group of data words from the memory matrix 235. For example, the group A of data words written into memory 235 of FIG. 6 between times $t_0$ and $t_1$ will be read out from memory 235 in interleaved fashion during time period $t_2-t_4$, as shown in block 281 of FIG. 10B.

When the next group of 21 pulses is initiated by an initiating signal supplied from controller 190 to timing means 191 such initiating signal will also be supplied via lead 276 to reset the write-in address pointer of buffer memory 240 to zero so that the 21 pulses generated by timing means 191 will cause the 21 data words supplied from receiver/digitizer means 195 to be entered into the memory matrix 235 as computed for the prior interleaved group of data words by computing logic 241.

What is claimed is:

1. A system for converting sequentially received data words, in the form of successive groups of data words, into an interleaved output data word sequence, with each group of received data words consisting of T successive series of R data words, said system comprising:

N memories each having W word location levels, where $W \cdot N \geq T \cdot R$;

first logic means for writing successively received data words of any given group of data words into word location levels of successive ones of said N memories in a predetermined sequence such that successive data words are not written into the same memory;

means for reading from said memories every $R^{th}$ data word of said given group of data words written into said memories to leave an available word location level in each instance where a data word was read therefrom; and said first logic means comprising other logic means for writing successively received data words of the next and each subsequently received group of data words into the successively occurring available word location levels as they occur in the predetermined sequence of N memories, during the concurrent reading therefrom, of the data words of the immediately preceding given group of data words.

2. A system as in clam 2 in which said means for reading comprises:
- means for computing the storage distance increment $I_m$ between adjacent Rth stored words for the $m^{th}$ group of received data words assembled in terms of memory locations starting with the memory location containing the first $R^{th}$ data word and counting in a predetermined path along the memory locations of said N memories in said predetermined sequence and through successively increasing levels of said memory locations to the memory location containing the next $R^{th}$ data word, and in accordance with the expression:

$$R^m[\text{MOD}((T\cdot R)-1)]$$

where m is the $m^{th}$ group of data words measured from said first group of data words;
- means for computing the absolute address location $A_n$ of each of said $R^{th}$ words measured from a given memory location containing the first received data word of said first group of data words along said predetermined path to each of said $R^{th}$ words, and in accordance with the expression:

$$A_n = I_m \cdot (n-1)[\text{MOD}((T\cdot R)-1)]$$

where n is the $n^{th}$ one of the $R^{th}$ data words in the $m^{th}$ group of data words;
- means for computing the memory location level $W_n$ of each $R^{th}$ word to be read from said memories in accordance with the expression:

$$W_n = \text{LOWEST NEXT INTEGER OF } (1-A_n/N);$$
and

- means for computing the particular memory $M_n$ in which each $R^{th}$ word is stored in accordance with the expression:

$$M_n = A_n - (W_n - 1)N + 1.$$

3. A system for converting sequentially received data words, in each group of successively received groups of data words, into an interleaved output data word sequence, with each group of data words consisting of T successive series of R data words, said system comprising:
- N memories each having $W_n$ successive word location levels, where $W_n \cdot N \geq T \cdot R$;
- first logic means for writing successive data words of a first group of data words into successive ones of said N memories in a predetermined sequence of said memories and in predetermined word location levels;
- second logic means for reading from said memories every $R^{th}$ data word of said first group of data words written into said memories to leave an available word location level in each instance where a data word was read therefrom; and
- said first logic means further constructed to write successively received data words of the next received group of data words and each of the subsequently received groups of data words into those particular word location levels which become available by the reading therefrom of the data words of the immediately preceding received group of data words, in the order in which the data words of said immediately preceding received group of data were read therefrom and as each of said particular word location levels become available;
- where T, R, and N have values such that no memory is accessed more than once for every S consecutive write-ins of data words therein, and where S is an integer greater than unity.

4. A system as in claim 3 in which said means for reading comprises:
- means for computing the storage distance increment $I_m$ between adjacent $R^{th}$ stored words for the $m^{th}$ group of received data words measured in terms of memory locations starting with the memory location containing a first $R^{th}$ data word and in a predetermined path along the memory locations of said N memories in said predetermined sequence and through successively increasing levels of said memory locations to the memory location containing the next $R^{th}$ data word and in accordance with the expression:

$$R^m[\text{MOD}((T\cdot R)-1)]$$

where m is the $m^{th}$ group of data words measured from said first group of data words;
- means for computing the absolute address location $A_n$ of each of said $R^{th}$ words measured from a given memory location containing the first received $R^{th}$ data word of said first group of data words along said predetermined path to each of said $R^{th}$ words, and in accordance with the expression:

$$A_n = I_m \cdot (n-1)[\text{MOD}((T\cdot R)-1)]$$

where n is the $n^{th}$ one of the $R^{th}$ data words in the $m^{th}$ group of data words;
- means for computing the memory location level W of each $R^{th}$ word to be read from said memories in accordance with the expression:

$$W = \text{LOWEST NEXT INTEGER OF } (1+A_n/N);$$
and

- means for computing the particular memory $M_n$ in which each $R^{th}$ word is stored in accordance with the expression:

$$M_n = A_n - (W-1)N + 1.$$

5. A method for converting sequentially received data words into an interleaved output data word sequence employing N separate memories and with the received data words being written serially into successive ones of said memories and being read therefrom in said interleaved manner, and in which said received data words are received as successive groups of data words with each group consisting of T sequentially received series of R data words, and comprising the steps of:
- forming said multiple memories into a matrix of memory locations having N columns each comprised of one of said separate memories, and having $W_n$ rows each comprised of a corresponding memory location from each of said N memories;
- storing the first received group of data words into successive memory locations of successively selected columns of memory locations;
- reading each successive $R^{th}$ data words from said successive memory locations with each successive memory location being in successively different columns of memory;

storing the data words in subsequently received groups of data words in successive memory locations from which the data words of the immediately preceding group of data words were read in an interleaved manner and during the same time period that the data words of the immediately preceding group of data words were being read out;

reading, in said interleaved manner, each successive $R^{th}$ stored data word of each subsequently received group of data words from the memory locations of said memory matrix and in a different column of memory than the column of memory into which a data word from the next following group of data words is currently being stored; and selecting T, R, N and $W_n$ such that no two successive $R^{th}$ data words are stored in the same column of memory locations.

6. A method as in claim 5 in which the reading in said interleaved manner of each successive $R^{th}$ stored data word is in accordance with the following expressions:

$$I_m = R^m[\text{MOD}((T \cdot R) - 1)]$$

$$A_n = I_m \cdot (n-1)[\text{MOD}((T \cdot R) - 1)]$$

$$W_n = \text{NEXT LOWEST INTEGER OF } (1 + A_n/N)$$

$$M_n = A_n - (W_n - 1)N + 1$$

where $W_n$ is the row of memory locations in which the data word to be read is stored, $M_n$ is the particular memory in which the data word being accessed is stored, $A_n$ is the total address increment of the data word to be read measured from a given memory location along each successive row of memory locations in said given sequence, $I_m$ is the storage distance increment between adjacent $R^{th}$ stored data words for the $m^{th}$ processing interval and measured from a given received $R^{th}$ stored data word along each successive row of memory locations in said given sequence to the next $R^{th}$ stored data word, where n is the $n^{th}$ word being accessed in a given processing interval, and in which a processing interval is defined as the writing of a given group of data words into the memory matrix and the reading out of said given group of data words from said memory matrix in said interleaved manner.

7. In a system comprising N memories each having W successive word location levels, and means for selectively writing into and reading out of said memories, a method for converting sequentially received data words, in the form of successive groups of data words, into an interleaved output data word sequence, with each group of data words consisting of T successive series of R data words, and with $W \cdot N \geq T \cdot R$ and comprising the steps of:

writing successive data words of a first group of data words into successive ones of said memories in a predetermined sequence of said memories and in successively increasing word location levels;

reading from memory every $R^{th}$ stored data word of said first group of data words and each subsequently received group of data words from said memories to leave an available word location level in each word location level from whence a data word was read;

writing successively received data words of each of said subsequently received groups of data words into the available word location levels created by the reading therefrom of the data words of the immediately preceding group of data words and in the order in which the immediately preceding group of data words was read therefrom, but with the reading out of a data word and the writing in of a data not occurring simultaneously on the same word location; and selecting T, R, and N to have values such that no memory is accessed more than once for every S write-ins of data words therein, and where S is an integer greater than unity.

8. A method as in claim 7 in which the reading in said interleaved manner of each successive $R^{th}$ stored data word is in accordance with the following expressions:

$$I_m = R^m[\text{MOD}((T \cdot R) - 1)]$$

$$A_n = I_m(n-1)[\text{MOD}((T \cdot R) - 1)]$$

$$W_n = \text{NEXT LOWEST INTEGERS OF } (1 + A_n/N)$$

$$M_n = A_n - (W_n - 1)N + 1$$

where $W_n$ is the row of word location levels locations in which the data word to be read is stored, $M_n$ is the particular memory in which the data word being accessed is stored, $A_n$ is the total address increment of the data word to be read measured from a given word location along each successive row of word location levels in said given sequence, $I_m$ is the storage distance increment between adjacent $R^{th}$ stored data words for the $m^{th}$ processing interval and measured from a given received $R^{th}$ stored data word along each successive row of word location levels in said given sequence to the next $R^{th}$ stored data word, where n is the $n^{th}$ word being accessed in a given processing interval, and in which a processing interval is defined as the writing of a given group of data words into said memories and the reading out of said given group of data words from said memories in said interleaved manner.

* * * * *

UNITED STATES PATENT AND TRADEMARK OFFICE
CERTIFICATE OF CORRECTION

PATENT NO. : 4,393,444

DATED : July 12, 1983

INVENTOR(S) : Leonard Weinberg

It is certified that error appears in the above-identified patent and that said Letters Patent is hereby corrected as shown below:

On the title page:

In the Abstract, line 14, after "words written into the" insert --memory--.

Col. 10, line 1, "$I_m = R^m [MOD((T \cdot R - 1)]$" should be --$I_m = R^m [MOD((T \cdot R) - 1)]$--.

Col. 10, line 7, "$I_m = 3[MOD((T \cdot R - 1)]$"' should be $I_m = 3[MOD((T \cdot R) - 1)]$--.

Col. 11, line 42, "integr-value-determining" should be --integer-value-determining--.

Col. 14, line 9, "pulses" should be --pulse--.

In the Claims,

Col. 17, line 5, "assembled" should be --measured--.

Signed and Sealed this

Eleventh Day of October 1983

[SEAL]

Attest:

GERALD J. MOSSINGHOFF

Attesting Officer

Commissioner of Patents and Trademarks